United States Patent
Maeda et al.

(10) Patent No.: US 7,608,973 B2
(45) Date of Patent: Oct. 27, 2009

(54) DYNAMOELECTRIC ROTOR

(75) Inventors: Naohide Maeda, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 160 days.

(21) Appl. No.: 11/592,197

(22) Filed: Nov. 3, 2006

(65) Prior Publication Data
US 2007/0114879 A1    May 24, 2007

(30) Foreign Application Priority Data
Nov. 24, 2005    (JP) .............................. 2005-338273

(51) Int. Cl.
*H02K 3/46* (2006.01)
(52) U.S. Cl. ...................... 310/263; 310/194
(58) Field of Classification Search ................ 310/263, 310/194; *H02K 19/22, 3/46, 3/51*
See application file for complete search history.

(56) References Cited
U.S. PATENT DOCUMENTS
6,963,150 B2 * 11/2005 Isoda et al. .................... 310/71
2005/0156480 A1 * 7/2005 Imai et al. .................... 310/263

FOREIGN PATENT DOCUMENTS
DE         4430073 A1 *  2/1996
FR         2618271 A2 *  1/1989
JP         2001-037180 A    2/2001

* cited by examiner

*Primary Examiner*—Truc T Nguyen
*Assistant Examiner*—Jason Collins
(74) *Attorney, Agent, or Firm*—Sughrue Mion, PLLC

(57) ABSTRACT

A resin bobbin is mounted to a pole core by fitting a body portion thereof over first and second boss portions. A rotor coil is configured by winding a conducting wire onto the bobbin, and an output wire of the conducting wire that is led out from the wound portion is wound doubly onto an output wire securing portion of the bobbin. An edge portion of a radially-outermost surface of the output wire securing portion near the body portion is placed in contact with an inner circumferential wall surface of a first claw-shaped magnetic pole portion.

8 Claims, 7 Drawing Sheets

DYNAMOELECTRIC ROTOR

BACKGROUND OF THE INVENTION

1. Field of the Invention

The present invention relates to a rotor for a dynamoelectric machine such as an automotive alternator, etc., and particularly relates to a bobbin output wire securing portion construction that engages an output wire of a rotor coil.

2. Description of the Related Art

In conventional automotive alternator rotors, a rotor coil is wound onto an insulating bobbin that is disposed between a pair of pole core bodies, and output wires that are led out from the wound portion of the rotor coil are held by an output wire securing portion that is disposed on a flange portion of the insulating bobbin so as to prevent winding collapse. These output wires are protected electrically by an insulating tube, pass through a groove that is disposed on the pole core body, and are connected to terminals that are disposed on slip rings. An excitation current is supplied to the rotor coil by means of the slip rings and brushes that are housed in a brush holder that is held by a bracket.

Generally, speed increasing ratios of automotive alternators are set so as to be high so as to achieve sufficient output even when rotational frequency is low in the engine that drives the alternator, and maximum rotational speeds can reach up to 18,000 rpm. Because of this, large centrifugal forces act on the output wires of the rotor. The rotational speeds of vehicle engines also vary depending on vehicle speed, electric loads, etc., generating rotational fluctuations in an internal-combustion engine. These changes in rotational speed act on the output wires of the rotor. Because stresses thereby act on the output wires repeatedly, one problem has been that the output wires are easily broken, reducing durability of the output wires.

In order to solve problems of this kind, in Patent Literature 1, for example, output wires of a rotor coil that are led out from an output wire securing portion are disposed so as to extend alongside a wall surface that is formed into a root portion between claw-shaped magnetic poles of a pole core body parallel to a central axis of a shaft. Because the length of the output wires can thereby be shortened, centrifugal force that acts on the output wires is reduced, making the output wires less likely to break and improving durability of the output wires.

Patent Literature 1: Japanese Patent Laid-Open No. 2001-37180 (Gazette)

Because automotive alternators are mounted in engine compartments, they must generate power in the high ambient temperatures of engine compartments, which are at approximately 100 degrees Celsius, and temperatures in the stator coil, etc., which is a heat-generating portion, may even reach 200 degrees Celsius. Thus, the insulating bobbin onto which the rotor coil is wound is prepared using a resin while taking into account insulation, heat resistance, cost, etc.

Now, in an automotive alternator according to Patent Literature 1, if large centrifugal forces occur at high temperatures, because the output wire securing portion of the insulating bobbin in particular is subjected to the centrifugal force that acts on the output wires in addition to the centrifugal force that acts on the output wire securing portion itself while being exposed to high temperatures, the output wire securing portion may also deform greatly. Thus, one problem has been that large stresses act on the output wires held by the output wire securing portion, giving rise to wire breakage in the output wires and reducing durability of the output wires.

SUMMARY OF THE INVENTION

The present invention aims to solve the above problems and an object of the present invention is to provide a dynamoelectric rotor that enables durability of an output wire to be improved by making centrifugal force that acts on an output wire securing portion be borne by a claw-shaped magnetic pole portion to suppress deformation of the output wire securing portion.

In order to achieve the above object, according to one aspect of the present invention, there is provided a dynamoelectric rotor including: a pole core having: a cylindrical boss portion; yoke portions that are respectively disposed so as to extend radially outward from two axial end edge portions of the boss portion; and a plurality of claw-shaped magnetic pole portions that are disposed so as to extend axially from outer circumferential portions of the yoke portions so as to intermesh with each other alternately; and a shaft that is inserted through a central axial position of the boss portion and that supports the pole core so as to be unable to rotate relatively. The rotor also includes: a resin bobbin having: a cylindrical body portion; flange portions that are respectively disposed so as to extend radially outward from two axial end edge portions of the body portion; and an output wire securing portion that is disposed so as to extend radially outward from the flange portions, the bobbin being mounted to the pole core by fitting the body portion over the boss portion; and a rotor coil that is configured by winding a conducting wire onto the bobbin and in which an output wire that is led out from a wound portion of the conducting wire is wound onto the output wire securing portion. At least a portion of a radially-outermost portion of the output wire securing portion is placed in contact with an inner circumferential wall surface of the claw-shaped magnetic pole portions.

According to the present invention, centrifugal force that acts on the output wire securing portion when the rotor rotates is borne by the claw-shaped magnetic pole portions, suppressing deformation of the output wire securing portion. Thus, breakage of the output wire is prevented, improving durability of the output wires.

DETAILED DESCRIPTION OF THE PREFERRED EMBODIMENTS

Embodiment 1

Figure 1:
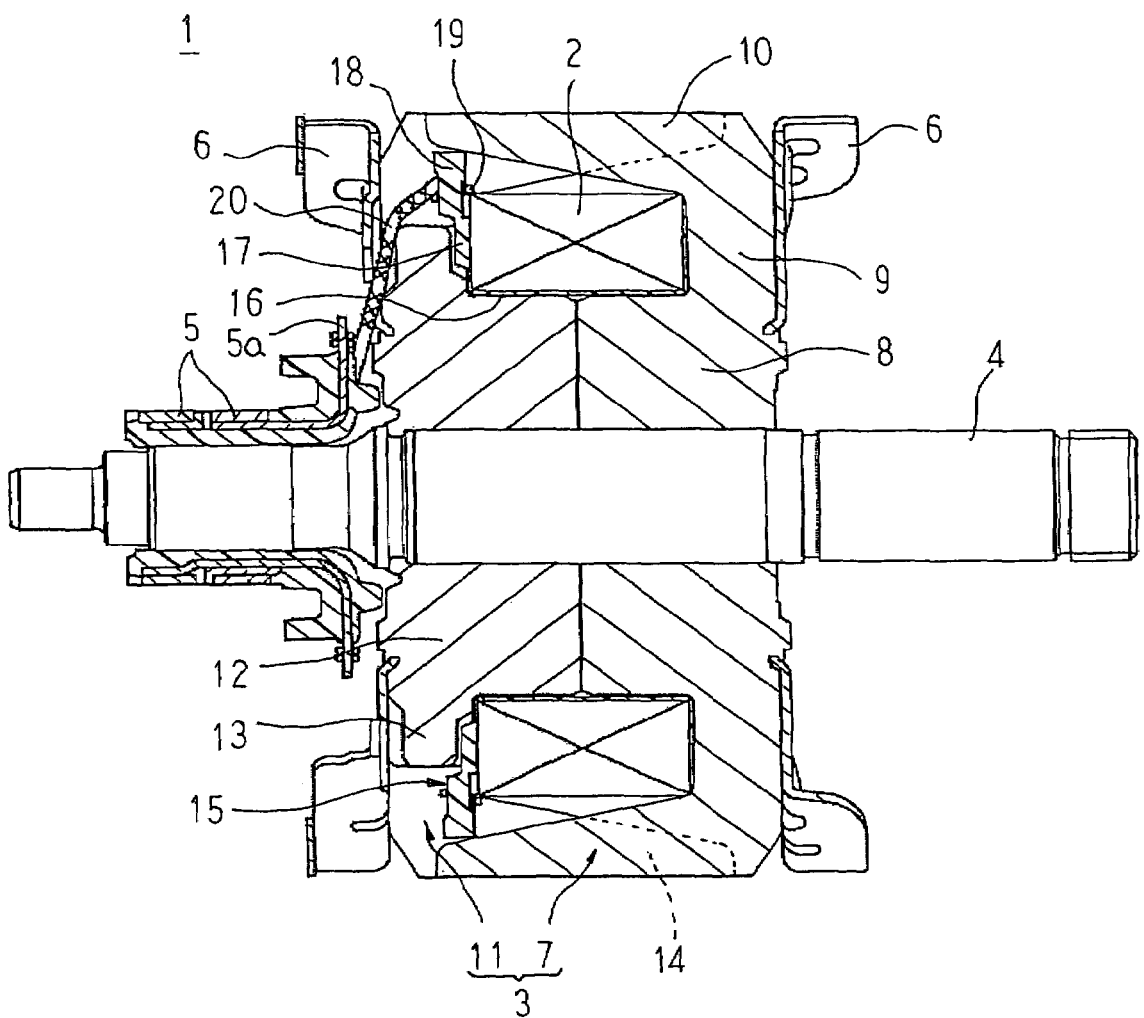
FIG. 1 is a longitudinal section of an automotive alternator rotor according to Embodiment 1 of the present invention.
Figure 2:
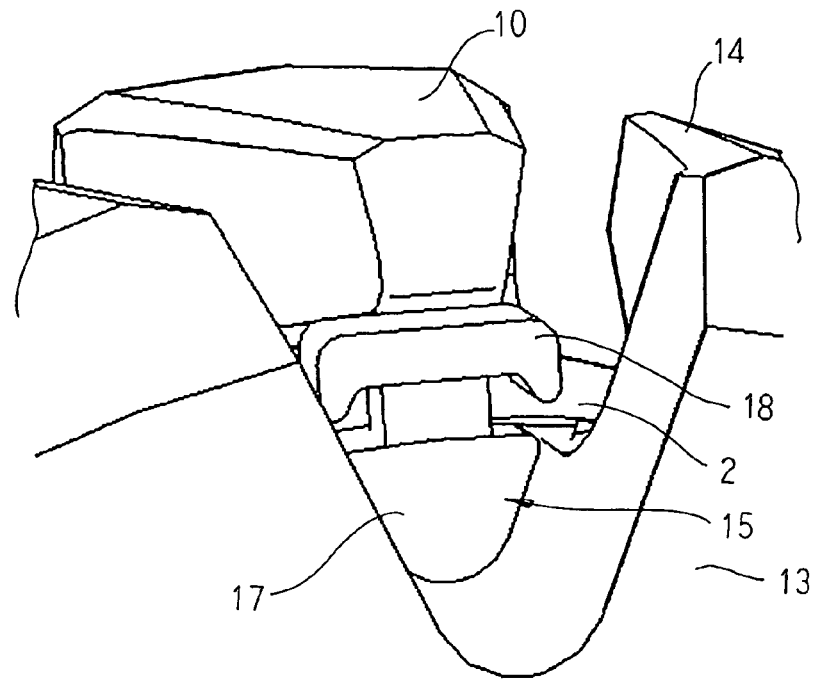
FIG. 2 is a perspective of a main part of the automotive alternator rotor according to Embodiment 1 of the present invention.
Figure 3:
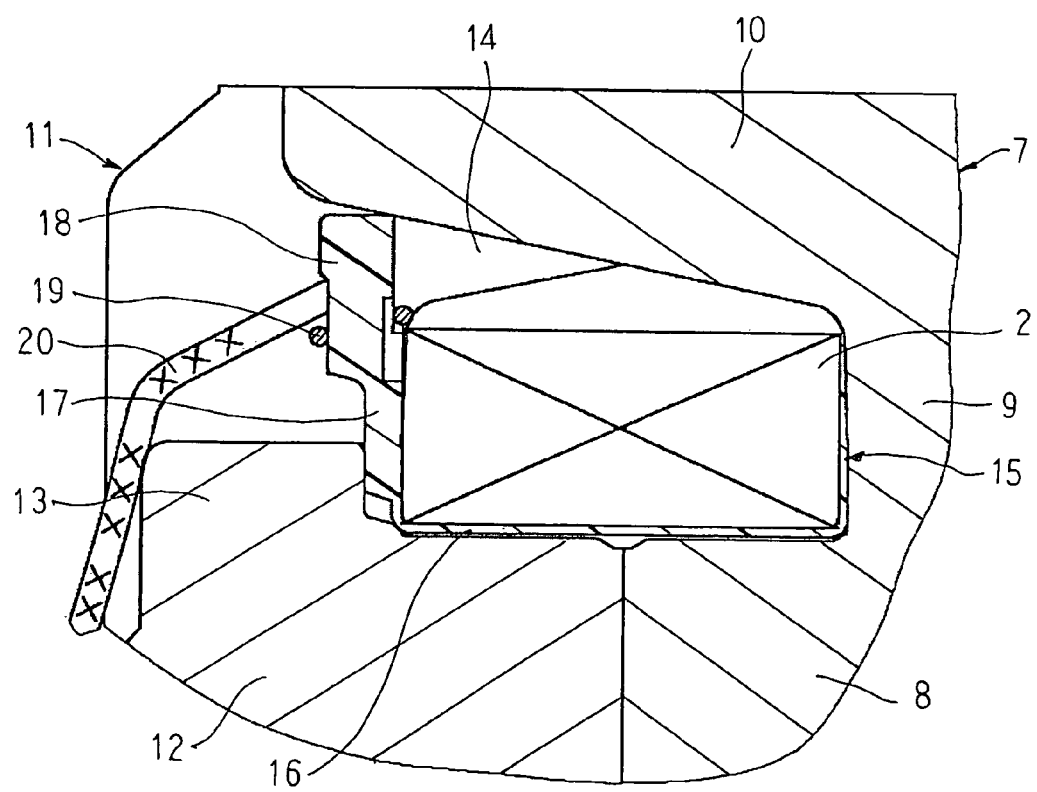
FIG. 3 is a cross section of the main part of the automotive alternator rotor according to Embodiment 1 of the present invention.

FIG. 1 is a longitudinal section of an automotive alternator rotor according to Embodiment 1 of the present invention, FIG. 2 is a perspective of a main part of the automotive alternator rotor according to Embodiment 1 of the present invention, and FIG. 3 is a cross section of the main part of the automotive alternator rotor according to Embodiment 1 of the present invention.

In FIGS. 1 through 3, a rotor 1 includes: a rotor coil 2 that generates magnetic flux on passage of an excitation current; a pole core 3 that is disposed so as to cover the rotor coil 2 and in which magnetic poles are formed by that magnetic flux; a shaft 4 that is fitted through a central axial position of the pole core 3; slip rings 5 that are fixed to an end portion of the shaft 4 that projects outward at a first axial end of the pole core 3; and a pair of fans 6 that are fixed to two axial end surfaces of the pole core 3.

Here, the pole core 3 is constituted by first and second pole core bodies 7 and 11 that are each made of a low carbon steel using a forging method.

The first pole core body 7 has: a columnar first boss portion 8 through which a shaft insertion aperture is disposed at a central axial position; a thick ring-shaped first yoke portion 9 that is disposed so as to extend radially outward from a first end edge portion of the first boss portion 8; and first claw-shaped magnetic pole portions 10 that are disposed so as to extend toward a second axial end from outer circumferential portions of the first yoke portion 9. Eight first claw-shaped magnetic pole portions 10, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arrayed on the outer circumferential portions of the first yoke portion 9 at a uniform angular pitch circumferentially.

Similarly, the second pole core body 11 has: a columnar second boss portion 12 through which a shaft insertion aperture is disposed at a central axial position; a thick ring-shaped second yoke portion 13 that is disposed so as to extend radially outward from a second end edge portion of the second boss portion 12; and second claw-shaped magnetic pole portions 14 that are disposed so as to project toward a first axial end from outer circumferential portions of the second yoke portion 13. Eight second claw-shaped magnetic pole portions 14, for example, are formed so as to have a tapered shape in which a radially-outermost surface shape is an approximately trapezoidal shape, a circumferential width gradually becomes narrower toward a tip end, and a radial thickness gradually becomes thinner toward the tip end, and are arrayed on the outer circumferential portions of the second yoke portion 13 at a uniform angular pitch circumferentially.

The first and second pole core bodies 7 and 11 are mounted so as to be unable to rotate relative to the shaft 4 that is press-fitted into the shaft insertion aperture of the first and second boss portions 8 and 12 in a state in which the first and second claw-shaped magnetic pole portions 10 and 14 face each other so as to intermesh with each other and end surfaces of the first and second boss portions 8 and 12 are abutted with each other.

A bobbin 15 is made into an approximate spool shape using a resin, and includes: a cylindrical body portion 16; a pair of disk-shaped flange portions 17 that are disposed so as to extend radially outward from first and second end edge portions of the body portion 16; and a T-shaped output wire securing portion 18 that is disposed so as to extend radially outward from one of the flange portions 17.

The bobbin 15 is mounted to the pole core 3 by fitting the body portion 16 over the first and second boss portions 8 and 12. The rotor coil 2 is configured by winding a conducting wire onto the bobbin 15 for a predetermined number of turns and is disposed inside a space that is surrounded by the first and second boss portions 8 and 12, the first and second yoke portions 9 and 13, and the first and second claw-shaped magnetic pole portions 10 and 14. Output wires 19 of the rotor coil 2 that are led out from the wound portion of the conducting wire that is wound onto the bobbin 15 are wound doubly onto the output wire securing portion 18 such that the wound portion of the conducting wire is held so as to prevent winding collapse, are then covered by an insulating tube 20 and extended alongside the second pole core body 11, and electrically connected to terminals 5a of the slip rings 5. An edge portion of a radially-outermost surface (radially-outermost portion) of the output wire securing portion 18 near the body portion 16 is placed in contact with an inner circumferential wall surface of a first claw-shaped magnetic pole portion 10.

Although not shown, an automotive alternator that incorporates a rotor 1 that is configured in this manner is mounted to a vehicle. In this automotive alternator, field current is supplied from a battery (not shown) through the slip rings 5 to the rotor coil 2 of the rotor 1, generating magnetic flux. The first claw-shaped magnetic pole portions 10 of the first pole core body 7 are magnetized into North-seeking (N) poles by this magnetic flux, and the second claw-shaped magnetic pole portions 14 of the second pole core body 11 are magnetized into South-seeking (S) poles. At the same time, rotational torque from an engine is transmitted from an output shaft of the engine through a belt and a pulley (not shown) to the shaft 4, rotating the rotor 1. Thus, a rotating magnetic field is applied to a stator winding of a stator (not shown), generating electromotive force in the stator winding. This alternating-current electromotive force is rectified into direct current by a rectifier (not shown) so as to charge the battery and also to be supplied to an electric load.

Centrifugal force acts on the bobbin 15 and the output wires 19 when the rotor 1 rotates. Because the output wires 19 are wound onto the output wire securing portion 18, the output wire securing portion 18 is subjected to the centrifugal force that acts on the output wires 19 in addition to the centrifugal force that acts on the output wire securing portion 18 itself. Because the output wire securing portion 18 is placed in contact with the inner circumferential wall surface of the first claw-shaped magnetic pole portion 10, the centrifugal force that acts on the output wire securing portion 18 is borne by the first claw-shaped magnetic pole portion 10.

Thus, since the pole core 3 is made of a low carbon steel and the weight of the output wire securing portion 18 is lighter than that of the first claw-shaped magnetic pole portions 10, the quantity of deformation in the first claw-shaped magnetic pole portion 10 is not affected by the centrifugal force to acts through the output wire securing portion 18 and does not change.

Thus, because deformation of the output wire securing portion 18 can be suppressed even if the rotor 1 rotates in a state that is exposed to high temperatures, breakage of the output wires 19 can be prevented, enabling durability of the output wires 19 to be improved.

Embodiment 2

Figure 4:
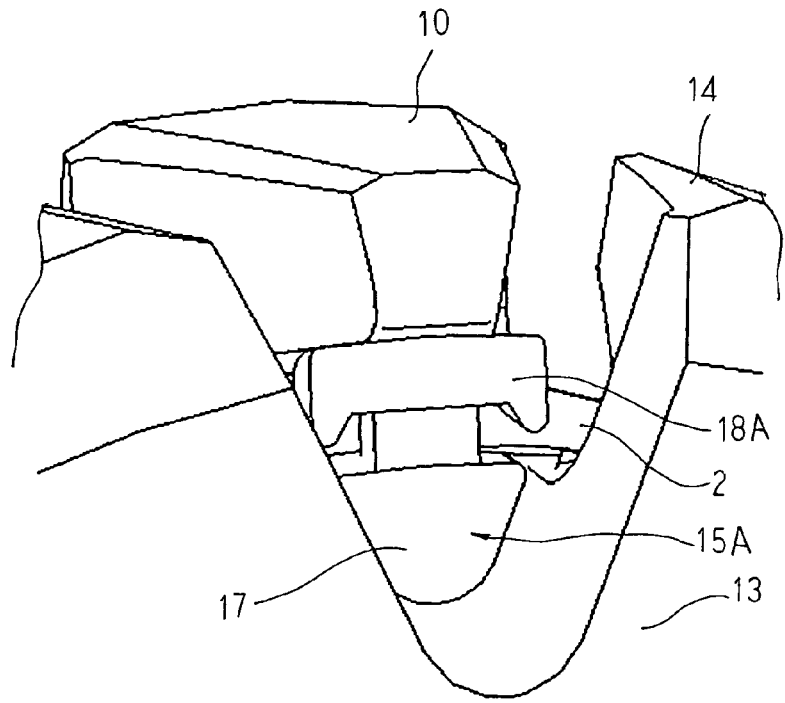
FIG. 4 is a perspective of a main part of an automotive alternator rotor according to Embodiment 2 of the present invention.
Figure 5:
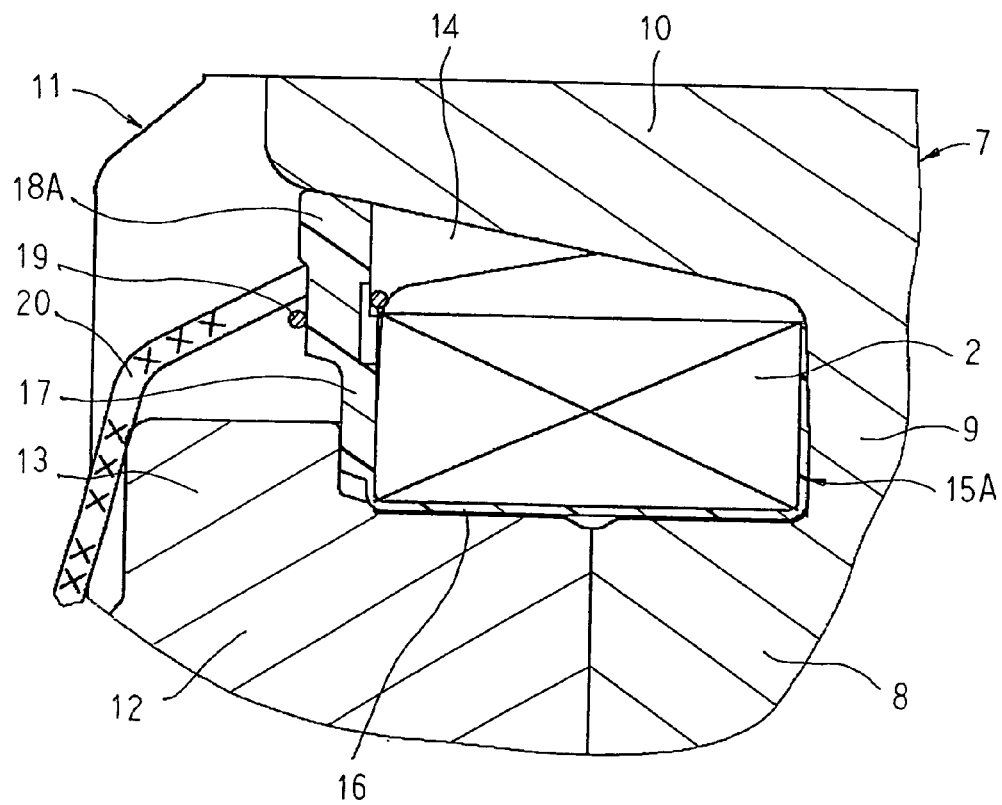
FIG. 5 is a cross section of the main part of the automotive alternator rotor according to Embodiment 2 of the present invention.

FIG. 4 is a perspective of a main part of an automotive alternator rotor according to Embodiment 2 of the present invention, and FIG. 5 is a cross section of the main part of the automotive alternator rotor according to Embodiment 2 of the present invention.

In FIGS. 4 and 5, a radially-outermost surface of an output wire securing portion 18A of a bobbin 15A is formed into an inclined surface that follows a surface shape of an inner circumferential wall surface of a first claw-shaped magnetic pole portion 10. The bobbin 15A is mounted such that the radially-outermost surface of the output wire securing portion 18A is placed in a state of surface contact with the inner circumferential wall surface of the first claw-shaped magnetic pole portion 10.

Moreover, the rest of this embodiment is configured in a similar manner to Embodiment 1 above.

In Embodiment 2, because the radially-outermost surface of the output wire securing portion 18A is placed in a state of surface contact with the inner circumferential wall surface of the first claw-shaped magnetic pole portion 10, weight of the output wire securing portion 18A due to centrifugal force is borne by the surface of the inner circumferential wall surface of the first claw-shaped magnetic pole portion 10. Thus, the occurrence of the damage to the output wire securing portion that results from centrifugal force being concentrated on a portion of the radially-outermost surface of the output wire securing portion is suppressed. In addition, because the weight of the output wire securing portion 18A due to centrifugal force is borne by the first claw-shaped magnetic pole portions 10 in a stable state, deformation of the output wire securing portion is suppressed even more.

Embodiment 3

Figure 6:
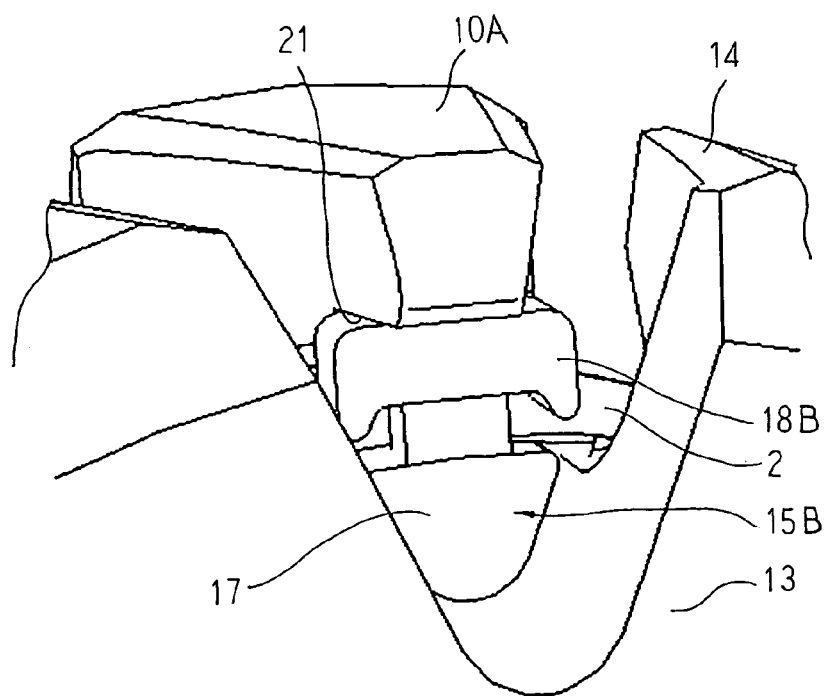
FIG. 6 is a perspective of a main part of an automotive alternator rotor according to Embodiment 3 of the present invention.
Figure 7:
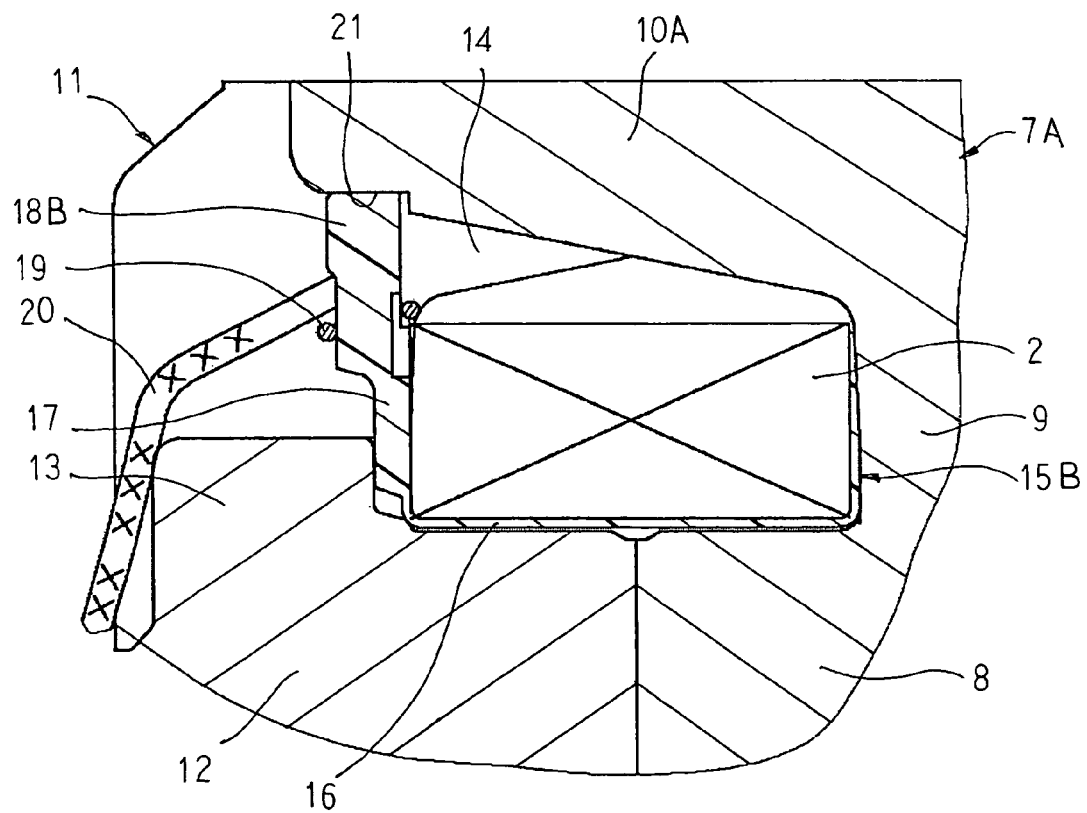
FIG. 7 is a cross section of the main part of the automotive alternator rotor according to Embodiment 3 of the present invention.

FIG. 6 is a perspective of a main part of an automotive alternator rotor according to Embodiment 3 of the present invention, and FIG. 7 is a cross section of the main part of the automotive alternator rotor according to Embodiment 3 of the present invention.

In FIGS. 6 and 7, a bearing surface 21 is formed on a tip end portion of an inner circumferential wall surface of a first claw-shaped magnetic pole portion 10A of a first pole core body 7A such that a surface shape thereof is a flat surface that is tangential to a cylindrical surface that is centered around a central axis of a shaft 4. A radially-outermost surface of an output wire securing portion 18B of a bobbin 15B is formed into a flat surface that follows the surface shape of the bearing surface 21 that is formed on the inner circumferential wall surface of the first claw-shaped magnetic pole portion 10A. The bobbin 15B is mounted such that the radially-outermost surface of the output wire securing portion 18B is placed in a state of surface contact with the bearing surface 21 on the inner circumferential wall surface of the first claw-shaped magnetic pole portion 10A.

Moreover, the rest of this embodiment is configured in a similar manner to Embodiment 1 above.

In Embodiment 3, because the radially-outermost surface of the output wire securing portion 18B is placed in a state of surface contact with the bearing surface 21 that is formed on the inner circumferential wall surface of the first claw-shaped magnetic pole portion 10A, weight of the output wire securing portion 18B due to centrifugal force is borne by the surface of the bearing surface 21 that is formed on the first claw-shaped magnetic pole portion 10A. Thus, the occurrence of the damage to the output wire securing portion that results from centrifugal force being concentrated on a portion of the radially-outermost surface of the output wire securing portion is suppressed. In addition, because the weight of the output wire securing portion 18B due to centrifugal force is borne by the first claw-shaped magnetic pole portions 10A in a stable state, deformation of the output wire securing portion is suppressed even more.

The shape of the output wire securing portion 18B is also simplified, enabling the bobbin 15B to be prepared inexpensively.

Embodiment 4

In Embodiments 1 through 3 above, a radially-outermost surface of an output wire securing portion is placed in contact with an inner circumferential wall surface of a first claw-shaped magnetic pole portion, but in Embodiment 4, a resin such as an adhesive, or a varnish, etc., is injected between a radially-outermost surface of an output wire securing portion and an inner circumferential wall surface of a first claw-shaped magnetic pole portion, and hardened.

According to Embodiment 4, because a resin is injected between the radially-outermost surface of the output wire securing portion and the inner circumferential wall surface of the first claw-shaped magnetic pole portion and hardened, even if gaps arise between the bobbin and the first pole core body due to their dimensional tolerances, such gaps are filled by the resin. Thus, because the output wire securing portion is fixed to the first claw-shaped magnetic pole portion, centrifugal force is borne by the first claw-shaped magnetic pole portion through the output wire securing portion, reliably suppressing deformation of the output wire securing portion 18.

Moreover, in Embodiments 1 through 4 above, centrifugal force is explained as being borne through the output wire securing portion by a first claw-shaped magnetic pole portion, but centrifugal force may also be borne through the output wire securing portion by a second claw-shaped magnetic pole portion.

Embodiment 5

Figure 8:
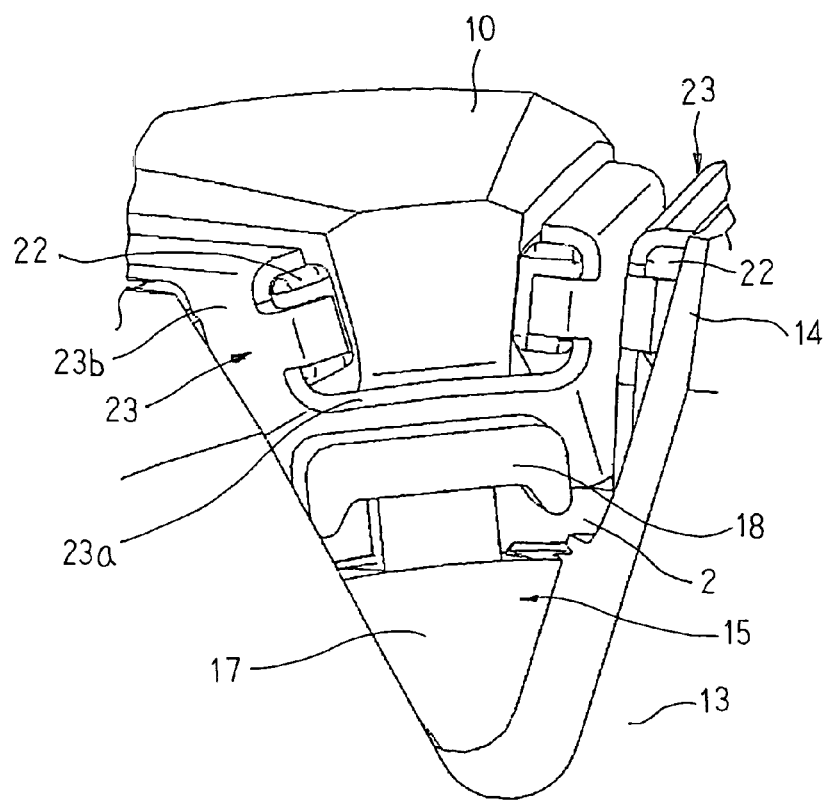
FIG. 8 is a perspective of a main part of an automotive alternator rotor according to Embodiment 5 of the present invention.
Figure 9:
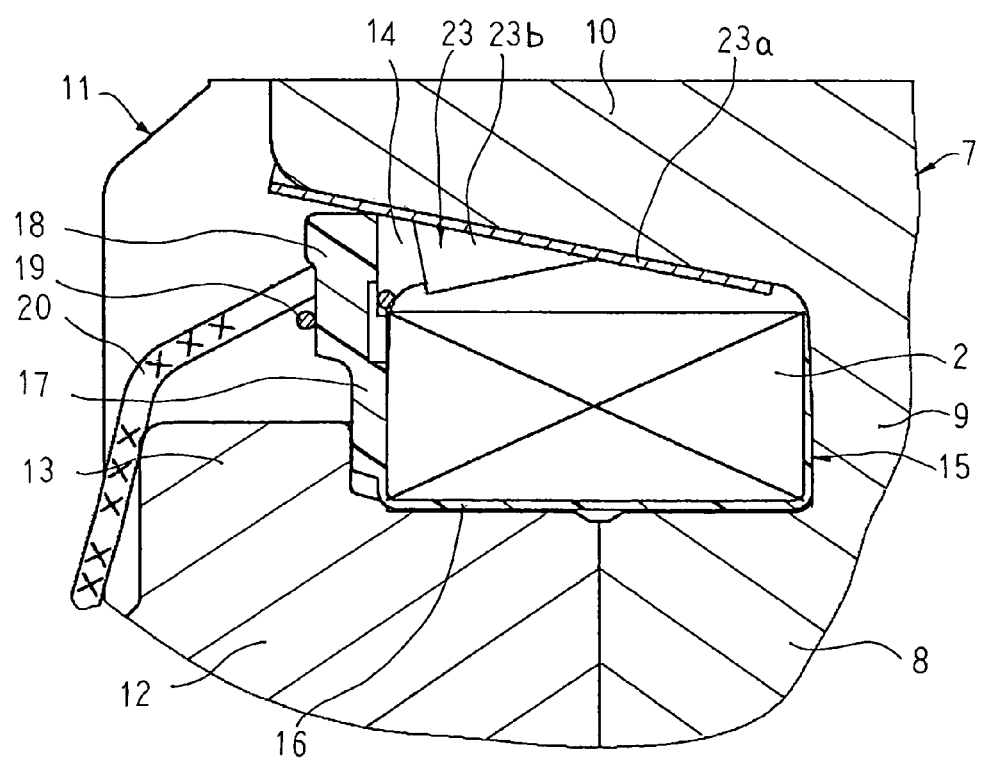
FIG. 9 is a cross section of the main part of the automotive alternator rotor according to Embodiment 5 of the present invention.

FIG. 8 is a perspective of a main part of an automotive alternator rotor according to Embodiment 5 of the present invention, and FIG. 9 is a cross section of the main part of the automotive alternator rotor according to Embodiment 5 of the present invention.

In FIGS. 8 and 9, permanent magnets 22 are prepared into a bulk body that has a cross-sectional shape approximately equivalent to a shape of a side surface of first and second claw-shaped magnetic pole portions 10 and 14.

Magnet holding members 23 are formed by folding and bending a stainless alloy plate, and have: trapezoidal base portions 23a that have an outer wall surface that is formed so as to have a surface shape that follows an inner circumferential wall surface of the first and second claw-shaped magnetic pole portions 10 and 14; and a pair of wing portions 23b that are formed on two sides of the base portions 23a. The wing portions 23b each have an angular C shape, and are formed on two side edges of the base portion 23a such that open ends of the angular C shapes face each other. The permanent magnets 22 are fixed to each of the wing portions 23b by an adhesive, etc.

These magnet holding members 23 are mounted to each of the first and second claw-shaped magnetic pole portions 10 and 14 such that the outer wall surface of the base portion 23a is placed in contact with the inner circumferential wall surface of the first and second claw-shaped magnetic pole portions 10 and 14 and are fixed by welding, etc. The permanent magnets 22 are disposed in a state of close contact with two circumferential side surfaces of each of the first and second claw-shaped magnetic pole portions 10 and 14. In addition, an edge portion of a radially-outermost surface of an output wire securing portion 18 of a bobbin 15 near a body portion 16 is placed in contact with an inner wall surface (a surface near a shaft) of a base portion 23a of a magnet holding member 23.

Moreover, the rest of this embodiment is configured in a similar manner to Embodiment 1 above.

In Embodiment 5, because the permanent magnets 22 are disposed between circumferentially-adjacent first and second claw-shaped magnetic pole portions 10 and 14 in a state of close contact with the side surfaces of the first and second claw-shaped magnetic pole portions 10 and 14, magnetic leakage flux between the first and second claw-shaped magnetic pole portions 10 and 14 is reduced, improving output.

Because the radially-outermost surface of the output wire securing portion 18 is placed in contact with the inner wall surface of the base portion 23a of a magnet holding member 23, weight of the output wire securing portion 18 due to centrifugal force is borne by a first claw-shaped magnetic pole portion 10 through the magnet holding member 23. Thus, because deformation of the output wire securing portion 18 can be suppressed, breakage of the output wires 19 can be prevented, enabling durability of the output wires 19 to be improved.

Embodiment 6

Figure 10:
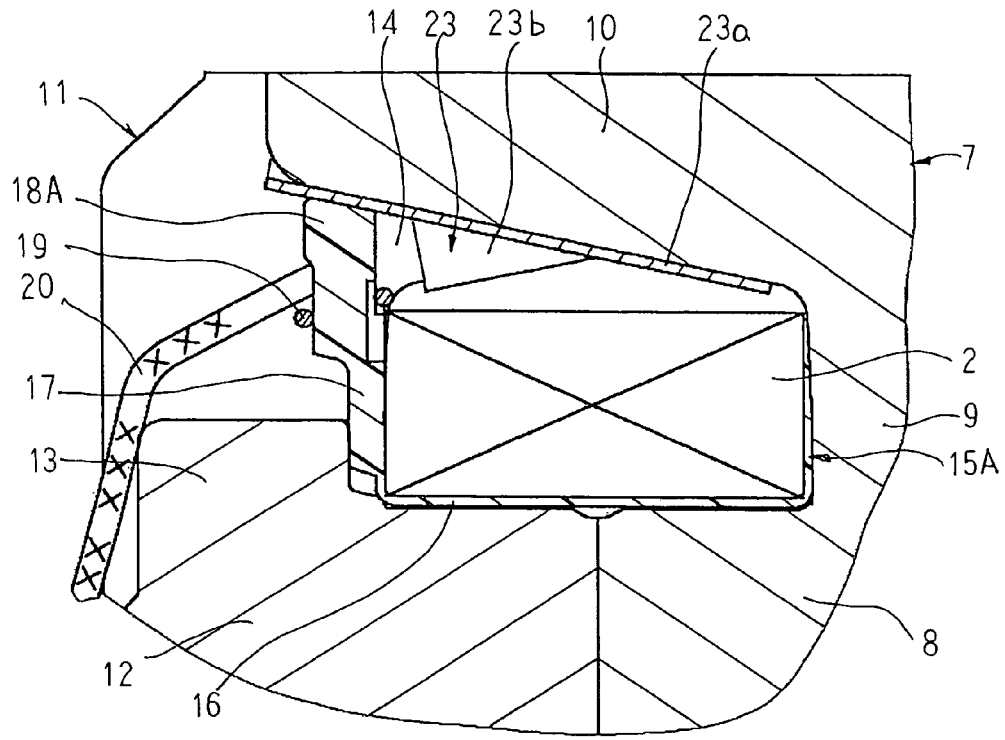
FIG. 10 is a cross section of a main part of an automotive alternator rotor according to Embodiment 6 of the present invention.

FIG. 10 is a cross section of a main part of an automotive alternator rotor according to Embodiment 6 of the present invention.

In FIG. 10, a radially-outermost surface of an output wire securing portion 18A of a bobbin 15A is formed into an inclined surface that follows a surface shape of an inner wall surface of a base portion 23a of a magnet holding member 23 that is mounted to a first claw-shaped magnetic pole portion 10, and is placed in a state of surface contact with the inner wall surface of the base portion 23a.

Moreover, the rest of this embodiment is configured in a similar manner to Embodiment 5 above.

In Embodiment 6, because the radially-outermost surface of the output wire securing portion 18A is placed in a state of surface contact with the inner wall surface of the base portion 23a of a magnet holding member 23, weight of the output wire securing portion 18A due to centrifugal force is borne by the surface of the magnet holding member 23. Thus, the occurrence of the damage to the output wire securing portion that results from centrifugal force being concentrated on a portion of the radially-outermost surface of the output wire securing portion is suppressed.

Embodiment 7

Figure 11:
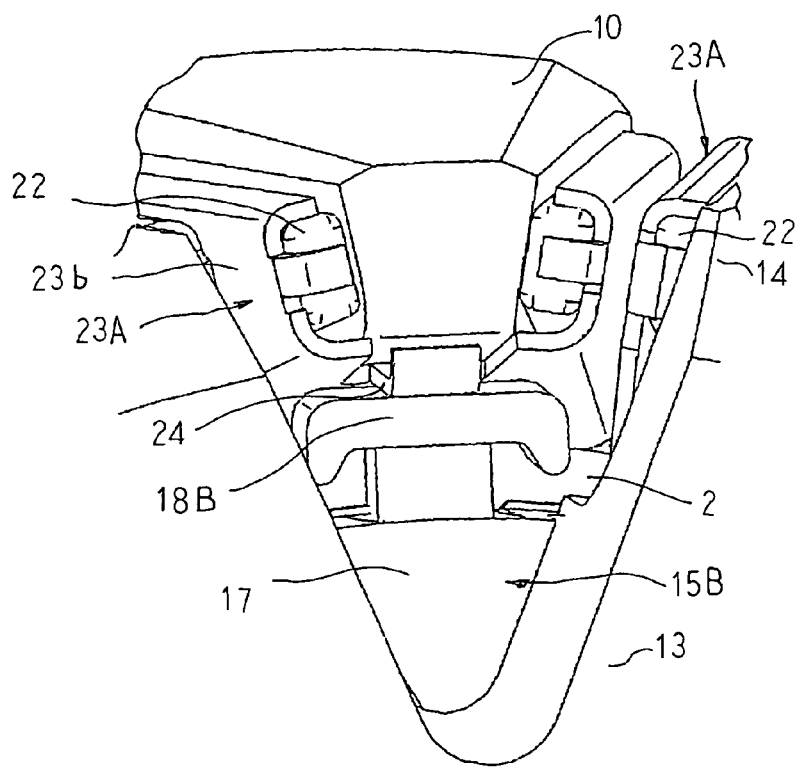
FIG. 11 is a perspective of a main part of an automotive alternator rotor according to Embodiment 7 of the present invention.
Figure 12:
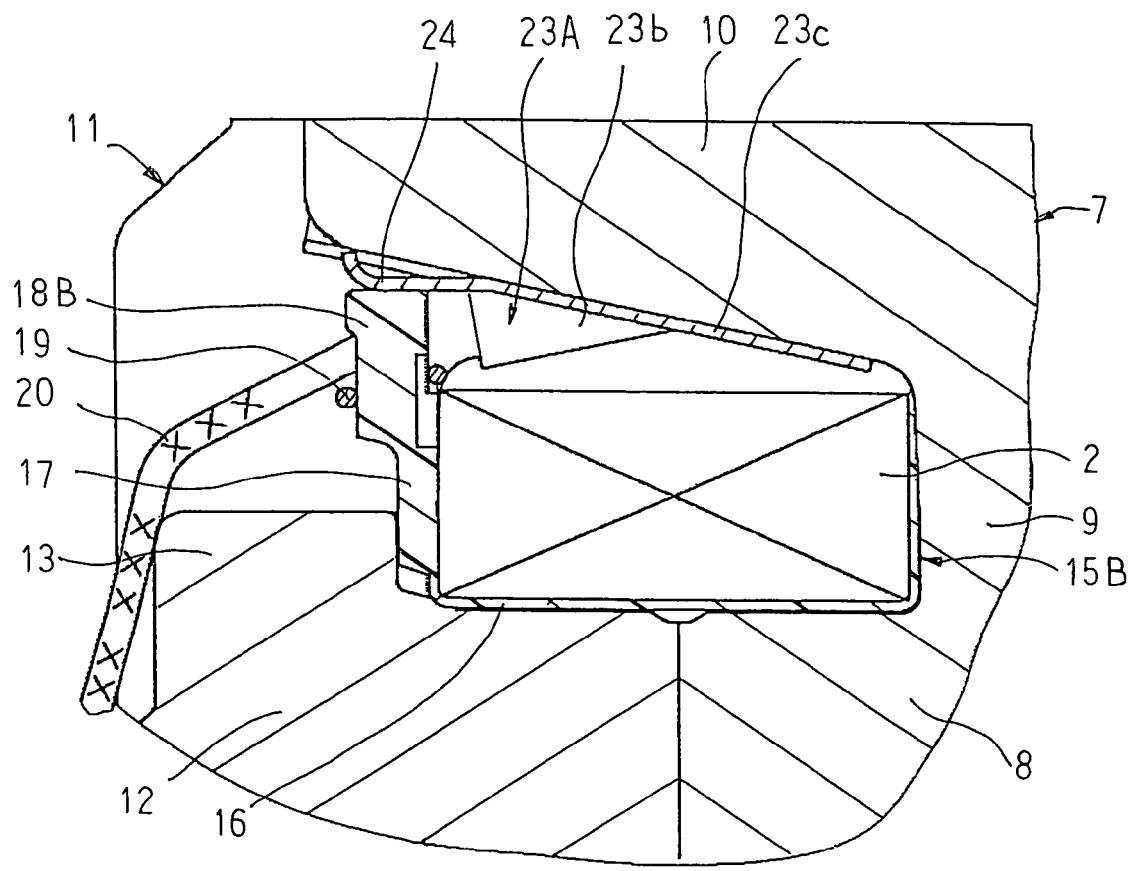
FIG. 12 is a cross section of the main part of the automotive alternator rotor according to Embodiment 7 of the present invention.

FIG. 11 is a perspective of a main part of an automotive alternator rotor according to Embodiment 7 of the present invention, and FIG. 12 is a cross section of the main part of the automotive alternator rotor according to Embodiment 7 of the present invention.

In FIGS. 11 and 12, a bearing segment 24 is formed by bending a portion of a base portion 23c of a magnet holding member 23A. An inner wall surface (a surface near a shaft) of this bearing segment 24 is formed into a flat surface that is tangential to a cylindrical surface that is centered around the central axis of the shaft. A radially-outermost surface of an output wire securing portion 18B of a bobbin 15B is formed into a flat surface that follows the inner wall surface of the bearing segment 24 that is formed on a portion of the base portion 23c, and is placed in a state of surface contact with the inner wall surface of the bearing segment 24.

Moreover, the rest of this embodiment is configured in a similar manner to Embodiment 5 above.

In Embodiment 7, because the radially-outermost surface of the output wire securing portion 18B is placed in a state of surface contact with the inner wall surface of the bearing segment 24 that is formed on a portion of a base portion 23c of the magnet holding member 23A, weight of the output wire securing portion 18B due to centrifugal force is borne by the surface of the segment 24 that is formed on the base portion 23c of the magnet holding member 23A that is mounted to the first claw-shaped magnetic pole portion 10. Thus, the occurrence of the damage to the output wire securing portion that results from centrifugal force being concentrated on a portion of the radially-outermost surface of the output wire securing portion is suppressed.

The shape of the output wire securing portion 18B is also simplified, enabling the bobbin 15B to be prepared inexpensively.

In addition, because the magnet holding member 23A can be made by press working, the bearing segment 24 can be prepared easily. Since it is not necessary to change the shape of the first and second claw-shaped magnetic pole portions 10 and 14, optimum shapes of the first and second claw-shaped magnetic pole portions 10 and 14 can be maintained.

Embodiment 8

In Embodiments 5 through 7 above, a radially-outermost surface of an output wire securing portion is placed in contact with an inner wall surface of a base portion of a magnet holding member, but in Embodiment 8, a resin such as an adhesive, or a varnish, etc., is injected between a radially-outermost surface of an output wire securing portion and an inner wall surface of a base portion of a magnet holding member, and hardened.

According to Embodiment 8, because a resin is injected between the radially-outermost surface of the output wire securing portion and the inner wall surface of the base portion of a magnet holding member and hardened, even if gaps arise between the bobbin and the magnet holding member due to their dimensional tolerances, such gaps are filled by the resin. Thus, because the output wire securing portion is fixed to the magnet holding member, centrifugal force is borne by the magnet holding member that is mounted to the first claw-shaped magnetic pole portion through the output wire securing portion, reliably suppressing deformation of the output wire securing portion.

Moreover, in Embodiments 5 through 8 above, centrifugal force is explained as being borne through the output wire securing portion by a magnet holding member that is mounted to a first claw-shaped magnetic pole portion, but centrifugal force may also be borne through the output wire securing portion by a magnet holding member that is mounted to a second claw-shaped magnetic pole portion.

In Embodiments 5 through 8 above, the magnet holding members are explained as being fixed to the claw-shaped magnetic pole portions by welding, but the magnet holding members may also be pressed against the claw-shaped magnetic pole portions by the force from a ring body that forces radially outward by mounting the ring body radially inside the magnet holding members.

Figure 13:
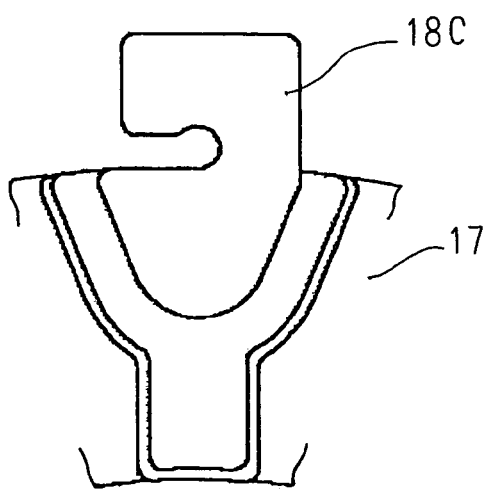
FIG. 13 is a partial front elevation of a preferred variation of a bobbin used in a rotor according to the present invention.

In each of the above embodiments, the output wire securing portion is explained as being formed so as to have a T shape, but an output wire securing portion 18C may also be formed so as to have a C shape, as shown in FIG. 13.

In each of the above embodiments, the present invention is explained as it applies to automotive alternator rotors, but the present invention is not limited to automotive alternators and similar effects are also exhibited if the present invention is applied to rotors for other dynamoelectric machines such as automotive alternating-current motors, automotive alternating-current generator-motors, etc.

What is claimed is:

1. A dynamoelectric rotor comprising:
    a pole core comprising:
    a columnar boss portion;
    yoke portions that are respectively disposed so as to extend radially outward from two axial end edge portions of said boss portion; and
    a plurality of claw-shaped magnetic pole portions that are disposed so as to extend axially from outer circumferential portions of said yoke portions so as to intermesh with each other alternately;
    a resin bobbin comprising:
    a cylindrical body portion;
    flange portions that are respectively disposed so as to extend radially outward from two axial end edge portions of said body portion; and
    an output wire securing portion that is disposed so as to extend radially outward from said flange portions,
    said resin bobbin mounted to said pole core by said cylindrical body portion fitted over said columnar boss portion;
    a rotor coil that is configured by winding a conducting wire onto said bobbin and in which an output wire that is led out from a wound portion of said conducting wire is wound onto said output wire securing portion; and
    a shaft that is inserted through a central axial position of said boss portion and that supports said pole core so as to be unable to rotate relatively,
    wherein at least a portion of a radially-outermost portion of said output wire securing portion is in contact with an inner circumferential wall surface of said claw-shaped magnetic pole portions.

2. A dynamoelectric rotor according to claim 1, wherein a contact surface between said radially-outermost portion of said output wire securing portion and said inner circumferential wall surface of said claw-shaped magnetic pole portions is a flat surface that is tangential to a cylindrical surface that is centered around a central axis of said shaft.

3. A dynamoelectric rotor according to claim 1, wherein said radially-outermost portion of said output wire securing portion is fixed to said inner circumferential wall surface of said claw-shaped magnetic pole portions by a resin.

4. The dynamoelectric rotor of claim 1, wherein an entire side surface of said radially-outermost portion of said output wire securing portion is in contact with said inner circumferential wall surface of said claw-shaped magnetic pole portions, wherein the entire side surface is tangential to a cylindrical surface that is centered around a central axis of said shaft.

5. A dynamoelectric rotor comprising:
    a pole core comprising:
    a columnar boss portion;
    yoke portions that are respectively disposed so as to extend radially outward from two axial end edge portions of said boss portion; and
    a plurality of claw-shaped magnetic pole portions that are disposed so as to extend axially from outer circumferential portions of said yoke portions so as to intermesh with each other alternately;
    permanent magnets that are disposed between adjacent claw-shaped magnetic pole portions;
    a magnet holding member comprising:
    a base portion that has an outer wall surface that is formed so as to have a surface shape that follows an inner circumferential wall surface of said claw-shaped magnetic pole portions; and
    wing portions that are formed on two sides of said base portions and to which said permanent magnets are respectively fixed,
    said outer wall surface of said base portion being disposed so as to be placed in contact with said inner circumferential wall surface of said claw-shaped magnetic pole portions such that said permanent magnets contact two circumferential side surfaces of said claw-shaped magnetic pole portions;
    a resin bobbin comprising:
    a cylindrical body portion;
    flange portions that are respectively disposed so as to extend radially outward from two axial end edge portions of said body portion; and
    an output wire securing portion that is disposed so as to extend radially outward from said flange portions,
    said resin bobbin mounted to said pole core by said cylindrical body portion fitted over said columnar boss portion;
    a rotor coil that is configured by winding a conducting wire onto said bobbin and in which an output wire that is led out from a wound portion of said conducting wire is wound onto said output wire securing portion; and
    a shaft that is inserted through a central axial position of said boss portion and that supports said pole core so as to be unable to rotate relatively,
    wherein at least a portion of a radially-outermost portion of said output wire securing portion is placed in contact with an inner wall surface of said base portion.

6. A dynamoelectric rotor according to claim 5, wherein a contact surface between said radially-outermost portion of said output wire securing portion and said inner wall surface of said base portion is a flat surface that is tangential to a cylindrical surface that is centered around a central axis of said shaft.

7. A dynamoelectric rotor according to claim 5, wherein said radially-outermost portion of said output wire securing portion is fixed to said inner wall surface of said base portion by a resin.

8. The dynamoelectric rotor of claim 5, wherein an entire side surface of said radially-outermost portion of said output wire securing portion is in contact with said inner wall surface of said base portion, wherein the entire side surface is tangential to a cylindrical surface that is centered around a central axis of said shaft.

* * * * *